United States Patent [19]

Hoppe et al.

[11] 4,033,477

[45] July 5, 1977

[54] DISPENSING APPARATUS HAVING PRODUCT ACCESS DOOR SEQUENTIAL CONTROL MECHANISM

[75] Inventors: William C. Hoppe; Theodore L. Hanson, both of Kansas City, Mo.

[73] Assignee: The Vendo Company, Overland Park, Kans.

[22] Filed: Mar. 25, 1976

[21] Appl. No.: 670,266

[52] U.S. Cl. .................. 221/114; 221/153; 312/35

[51] Int. Cl.[2] .................. B65G 59/00

[58] Field of Search .......... 221/112, 114, 151, 153, 221/154; 312/35, 91, 97; 68/12 R; 198/800

[56] References Cited

UNITED STATES PATENTS

| | | | |
|---|---|---|---|
| 3,111,830 | 11/1963 | Low | 68/12 R |
| 3,209,945 | 10/1965 | Gasparini et al. | 221/112 X |
| 3,556,284 | 1/1971 | Dyer et al. | 198/800 X |
| 3,752,546 | 8/1973 | O'Neal | 312/35 |

*Primary Examiner*—Stanley H. Tollberg
*Assistant Examiner*—Fred A. Silverberg
*Attorney, Agent, or Firm*—Schmidt, Johnson, Hovey & Williams

[57] ABSTRACT

A product dispensing machine of the type having conveyor means for moving successive product carriers, each divided into a plurality of separate product carrying compartments, into registry with a product dispensing zone, including separately shiftable access doors or closures for the paths to the various compartments, is provided and employs reliable, predominantly mechanical, control means for normally maintaining the access closures in closed and locked condition denying access to the products, for automatically both unlocking and opening the access closures in a predetermined sequence in response to successive actuation of a dispense cycle actuating means (such as a coinage deposit unit) permitting removal of the product from each of the compartments of the registered carrier in turn, and for automatically moving the next product carrier into registry with the dispensing zone, after all of the products have been sequentially dispensed from the preceding carrier, permitting the sequential dispensing of all products from all of the compartments of each successive carrier to be continued by successive actuation of the cycle actuating means until all products have been dispensed from the machine.

15 Claims, 11 Drawing Figures

Fig.1.
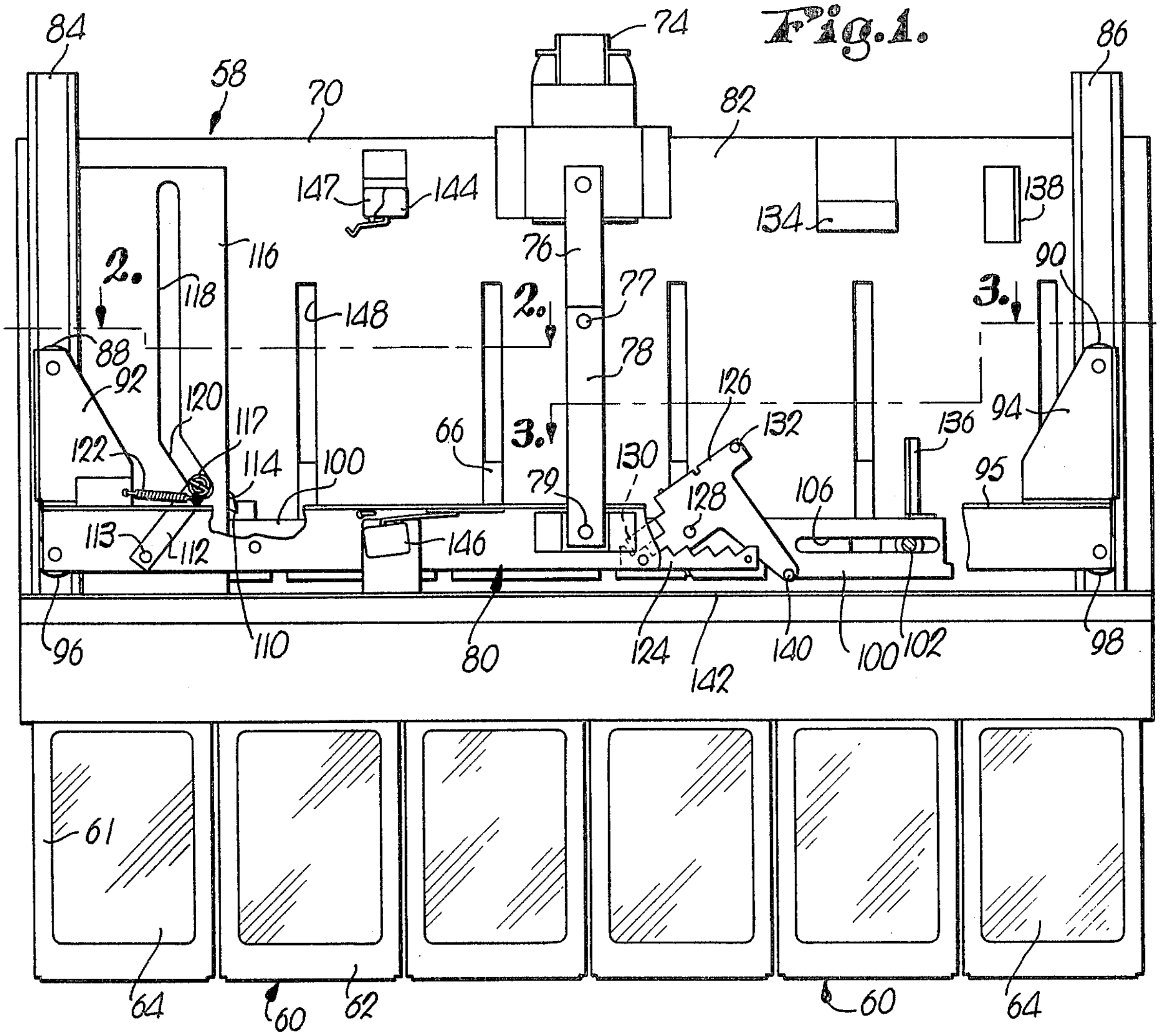
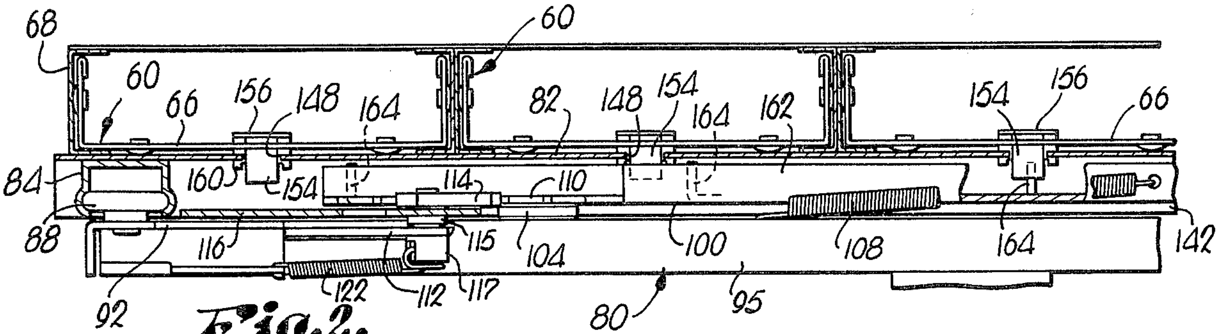
Fig.2.
Fig.3.
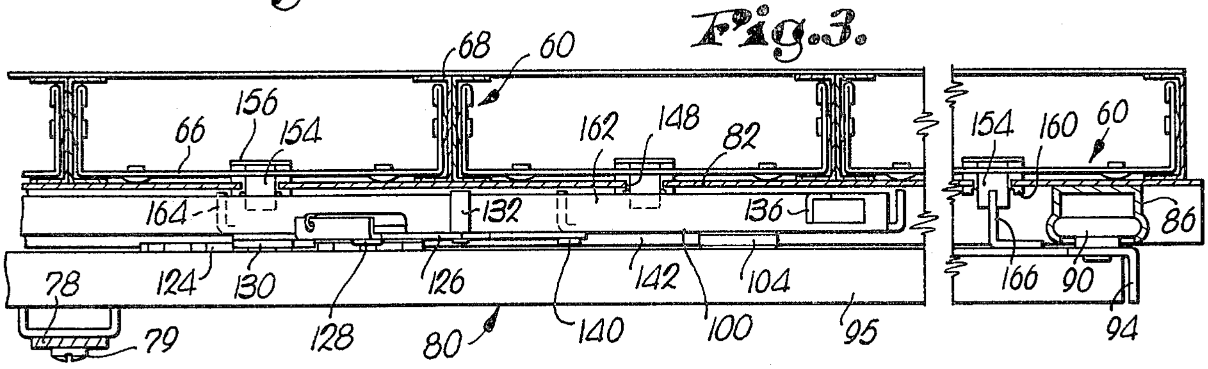

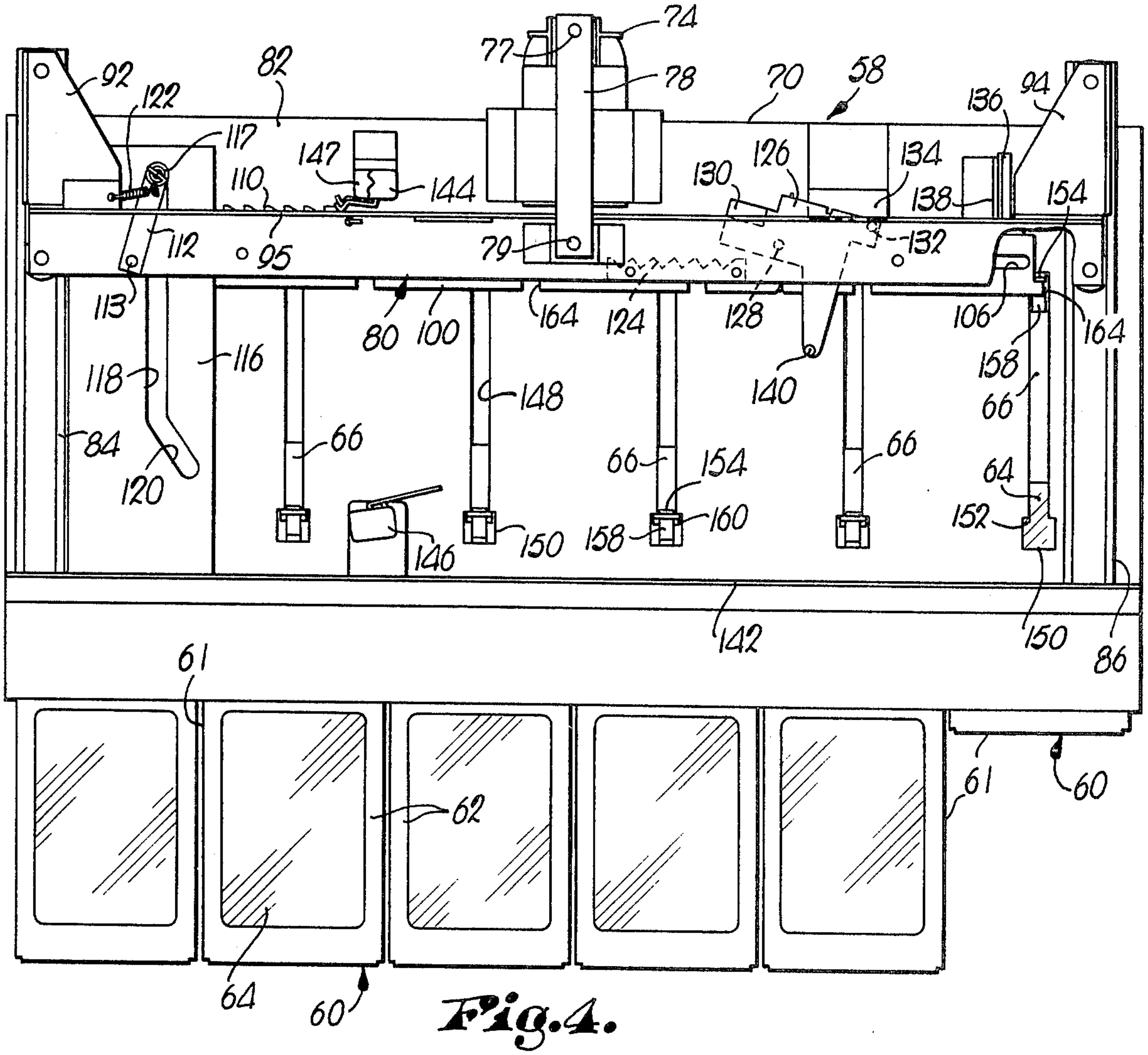
Fig.4.
Fig.6.
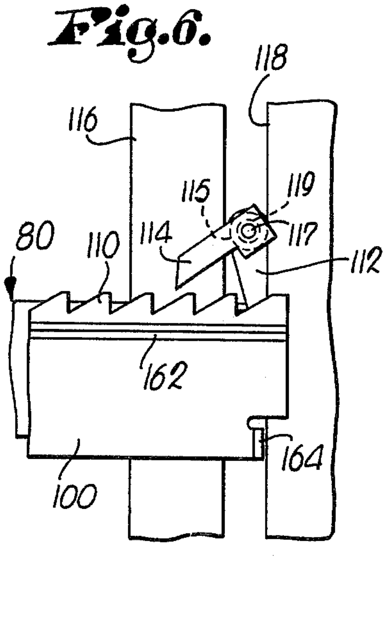
Fig.5.
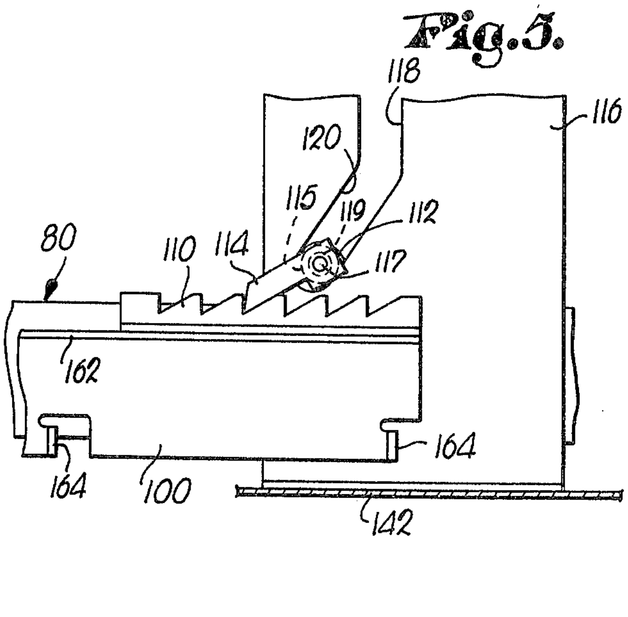

DISPENSING APPARATUS HAVING PRODUCT ACCESS DOOR SEQUENTIAL CONTROL MECHANISM

BACKGROUND OF THE INVENTION

This invention relates to the field of product dispensing or vending equipment, and, more particularly, to that general class of such machines in which products are stored in and dispensable from separate compartments of movable product carriers adapted to be brought into registry with a dispensing zone provided with separately shiftable product access closures respectively disposed for denying or permitting access to the product within a corresponding compartment of a carrier registered with the dispensing zone.

As will become more apparent hereinafter, however, it should be pointed out that the present invention is specifically concerned with providing a distinctly new type of machine within the mentioned general class, which is characterized by its automatic control of sequential dispensing of products in a predetermined order, as contrasted with earlier machines involving essentially manual control of dispensing on a user determined, selective and non-ordered basis.

The mentioned earlier machines, with which we are familiar, are of a type commonly referred as "general merchandiser machines," and are typified by the apparatuses disclosed in U.S. Pat. Nos. 3,556,284 and 3,770,105, both issued to the same assignee as the owner of this invention. The purpose of such general merchandiser machines is to provide the user with the widest possible selection of different products from those that can be stored within a given space. To that end, such general merchandiser machines employ a cabinet having a product access opening leading to a dispensing zone and provided with a plurality of individually shiftable product access closures of which any one may be selectively opened by a user (after appropriate coinage deposit in a vending environment) together with an endless conveyor arrangement provided with a plurality of product carriers that may be selectively positioned by the user in registry with the dispensing zone, each of which carriers has a plurality of separate product compartments each respectively aligned with a corresponding one of the product access closures. Thus, with such prior machines, the basic mode of operation is characterized by a user being able to first select and control the positioning of any particular carrier containing the desired product in one of its compartments into registry with the dispensing zone, then being able to gain access to the selected product by selectively opening the appropriate one of the access closures. The control and operating portions of such general merchandiser machines have typically been predominately electrical and characterized by the use of numerous product selection switches, closure unlocking solenoids and the like.

SUMMARY OF THE INVENTION

The present invention is contrastingly concerned, however, with providing a satisfactory type of machine for vending successive products of identical nature, and particularly products imposing environmental conditions within the machine rendering complex electrical control arrangements undesirable. Moreover, this invention is concerned with being able to employ existing technology with respect to product conveyors and access closures in order to retain the storage efficiency of such arrangements for bulky products, while controlling the same for sequential rather than selective operation, and by predominantly mechanical rather than electrical means.

Accordingly, it is the broad objective of this invention to provide a simple, economical and reliable machine for vending difficult products, such as bagged ice, sequentially and in a predetermined order during successive dispensing cycles of the machine, so that all products stored in the machine may be dispensed therefrom in an orderly manner assuring systematic depletion and susceptible to effective control over the required dispensing cycle operations by predominantly mechanical means. More specific objects of the invention will be made clear or become apparent from consideration of the construction and operation of our currently preferred embodiment of the invention shown in the accompanying drawings and hereinafter described.

BRIEF DESCRIPTION OF THE DRAWINGS

In the drawings:

FIG. 1 is a front elevational view of the product access closures and the predominantly mechanical, sequential operating means therefor provided in our currently preferred embodiment of the dispensing apparatus of the invention, with certain structures broken away to better reveal structures therebehind, and with the parts depicted in their standby conditions and as they would be prior to opening of the leftmost closure;

FIG. 2 is an enlarged, fragmentary, horizontal, cross-sectional view of a left portion of the mechanism shown in FIG. 1, taken looking downwardly along line 2—2 of FIG. 1, with the parts depicted in their standby conditions but as they would be prior to opening of the closure which is third from the left in FIG. 1;

FIG. 3 is an enlarged, fragmentary, horizontal, cross-sectional view of a right portion of the mechanism shown in FIG. 1, taken looking downwardly along line 3—3 of FIG. 1, with the parts depicted in the same conditions as in FIG. 2;

FIG. 4 is a front elevational view of the same mechanism as shown in FIG. 1, but with the parts depicted in a mid-cycle operating condition thereof as they would be during opening of the rightmost closure in FIG. 1;

FIG. 5 is an enlarged fragmentary, rear elevational view of the indexing ratchet portion of the mechanism, with the parts depicted in the condition they would be as indexing is completed prior to next opening the closure which is third from the left in FIG. 1;

FIG. 6 is an enlarged, fragmentary, rear elevational view of the same portion of the mechanism as shown in FIG. 5, but with the parts depicted in a mid-cycle operating condition thereof as they would be prior to the indexing whose completion is shown in FIG. 5;

DESCRIPTION OF THE PREFERRED EMBODIMENT

Figure 7:
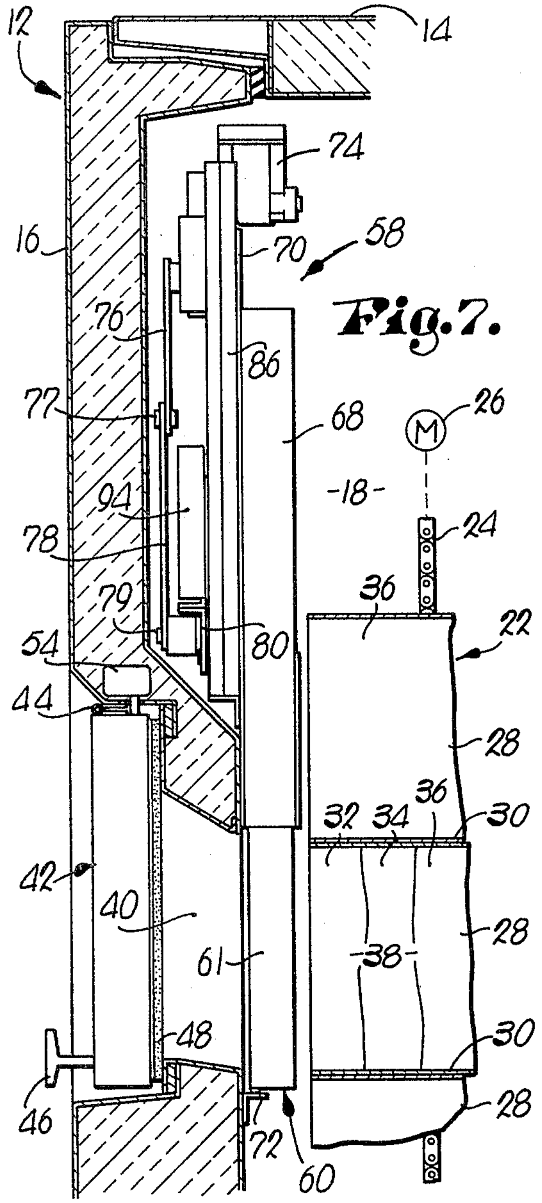
FIG. 7 is a fragmentary, vertical, cross-sectional view of the upper front portion of the apparatus taken looking laterally along line 7—7 of FIG. 11, showing the general relationship of the mechanism depicted in the preceding Figures to the cabinet, the access opening and outer door, and the product carrying conveyor portions of the apparatus, with certain parts and details omitted for clarity of illustration of the primary structures, and with the conventional conveyor depicted essentially only schematically.
Figure 11:
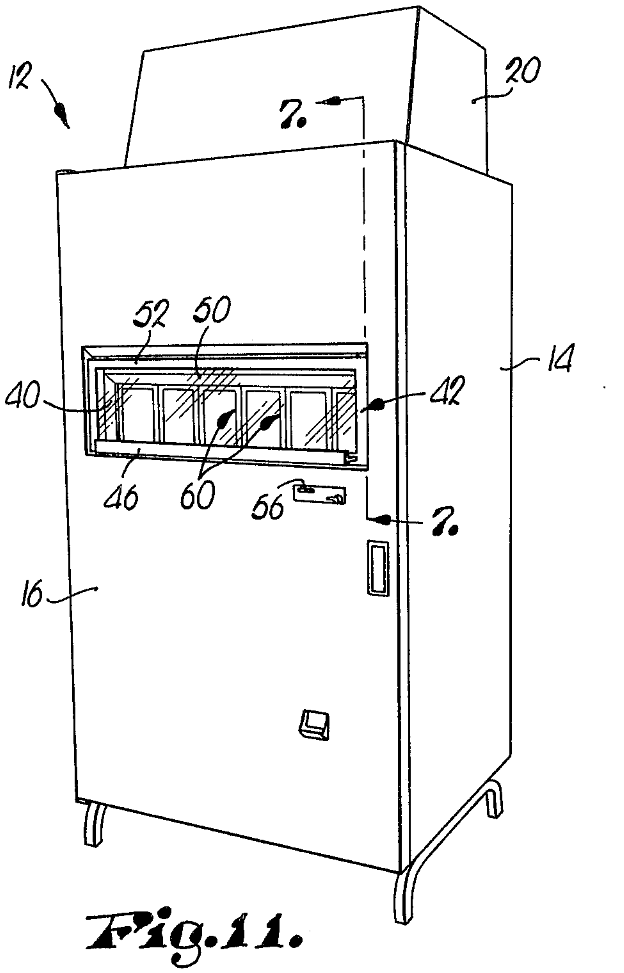
FIG. 11 is a perspective view of the front and one side of our currently preferred embodiment of the apparatus of the invention in a machine for sequentially vending substantially identical products such as bags of ice cubes.

Referring initially to FIGS. 7 and 11, it will be seen that the preferred embodiment of the invention in a machine 12 for vending products such as ice cubes includes an insulated cabinet 14 having a main frontal insulated door 16 for permitting operator access to the interior of the machine 12 for loading of products, maintenance, etc. The interior of the cabinet 14 provides a product receiving and storing chamber 18, which is refrigerated, in the machine 12 for dispensing ice, by conventional refrigerating means that can be located in a housing 20 atop the cabinet 14 (which alternately may accommodate conventional means for heating the chamber 18, if the products to be dispensed are of nature so requiring).

The products to be dispensed from the machine 12 are efficiently stored within the chamber 18, and relocatable therewithin for the purpose and in the manner subsequently noted, by means of an endless conveyor generally designated 22 provided within the cabinet 14. The general nature of the conveyor 22 and its installation within the cabinet 14 are per se conventional and are amply illustrated and described, for example, in U.S. Pat. Nos. 3,556,284 or 3,770,105, both assigned to the same assignee as the present invention, to which reference is made for those not already familiar with such equipment. Accordingly, it should herein suffice for full understanding by those skilled in the art to illustrate the conveyor 22 in the drawings somewhat schematically and abridgedly, which has been done, and to make specific reference to only those portions or features of the conventional conveyor 22 having some particular relevance to the present invention, which will be done in the summary that follows.

Thus, the conveyor 22 significantly includes endless chain means 24 trained over upper and lower sprocket means (not shown) adapted to be advanced upon energization of an electric motor 26, and a plurality of product carriers 28 connected to the chain means 24 for advancement therewith along an endless path within the chamber 18 along which the carriers 28 are guided by track means (not shown). Each of the carriers 28 is horizontally elongate and extends transversely of the chamber 18, and each carrier is provided with at least a bottom wall 30 and a plurality of vertical partitions such as at 32, 34, 36 in FIG. 7 dividing each carrier 28 into a plurality of separate, side-by-side product receiving and supporting compartments disposed along the length of the carrier 28, into each of which an individual product to be disposed is placed during loading, and from which such products are to be respectively removed by a user given access thereto during the sequential dispensing operations hereinafter further described. The chamber 18 includes a product dispensing zone 38 within the path of advancement of the carriers 28, which is delineated by the position of the middle carrier 28 illustrated in FIG. 7. The motor 26 is conventionally provided with means such as a one-revolution cam switch (not shown) and coupled with the chain means 24 in such manner that, upon each actuating energization of the motor 26, it will advance the conveyor 22 just enough to move the next carrier 28 into the product dispensing zone 38; thus, with successive energizations of the motor 26, each carrier 28 will in turn be moved into the product dispensing zone 38.

The main door 16 of the cabinet 14 is provided with an enlongate, horizontally extending, product access opening 40 aligned with the product access zone 38 within the cabinent 14, so as to provide, when not otherwise obstructed, a plurality of side-by-side paths for user access to the individual products within the resepective compartments of the carrier 28 disposed at the dispensing zone 38. An outer product access door 42 is swingably mounted at its top on the cabinet door 16 by hinge means 44; is manually swingable outwardly and upwardly to open the same by user manipulation of a handle 46; is normally urged toward a position completely closing the opening 40 by gravity and preferably spring action incorporated into the hinge means 44; is provided with marginal gasket means 48 for preserving a thermal sealing of the opening 40 when the door 42 is closed; and is preferably constructed with a central portion 50 of glass or other transparent material within a peripheral metal frame 52 to permit user viewing of products within the dispensing zone 38. In our preferred construction, an electrical feeler switch 54 is mounted within the cabinet door 16 in position to sense when the access door 42 is closed and is electrically associated with the energizing circuit for the conveyor motor 26, so that the latter will be inhibited for safety purposes from advancing the conveyor 22 unless and until the access door 42 is released by a user and in its closed position confirming the absence of the user's hand from the dispensing zone 38.

Although in a simple dispensing machine not requiring coinage deposit for actuation of a dispensing cycle a mere user accessible, electrical switch would suffice for such purpose, in the preferred vending machine embodiment of the invention the dispensing cycle actuating means is provided in the form of conventional coin handling means conventionally mounted in the cabinet door 16 and represented in FIG. 11 merely by the usual coinage receiver 56, since the details of the coin handling means per se are not a part of the present invention; those skilled in the art will sufficiently understand that, upon the deposit by a user of proper coinage in the receiver 56 of the coin handling means, an electrical signal will be produced which may be conventionally employed for energizing an electrical motor or the like for initiating actuation of a dispensing cycle, such as that of the machine 12 hereinafter more fully described.

Also mounted in any suitable fashion upon the interior of the cabinet door 16 above the access opening 40 is sequential product access control and operating mechanism 58, which significantly includes a plurality of vertically reciprocable, side-by-side, product access closure structures 60, equal in number to the number of product compartments in each of the carriers 28 of the conveyor 22. Each of the closure structures 60 has a lower portion 61 including a metallic frame 62 and a central panel 64 of glass or other transparent material to permit user viewing of products, and an upper portion 66 of generally U-shaped cross-section (See: FIGS. 2, 3, 8 and 9) which is slideably received in a corresponding guide channel 68 forming a part of the frame means 70 at the rear of the mechanism 58. The closure structures 60 are reciprocably shiftable independently of each other, and the normal position thereof is a lowered position in which the lower portion 61 of each closure 60 obstructs a corresponding part of the access opening 40, with the bottom of the closure 60 engaging a support flange 72 on the cabinet door 16 to restrict downward travel thereof. Each closure 60 may be raised as hereinafter explained, however, to clear the corresponding portion of the access opening 40. Thus, as will be most apparent from FIG. 11, each of the closures 60 serves, after opening of the door 42, to either clear or still obstruct the user access path to a corresponding product compartment of the carrier 28 disposed in the dispensing zone 38.

At this stage of the description, it may be helpful to recall that the purpose of the control and operating mechanism 58 is to provide for the sequential opening of the closures 60 in a predetermined order to effect dispensing of products through user removal thereof from each of the compartments of the carrier 28 disposed in the dispensing zone 38, then to cause advancement of the conveyor 22 to move the next carrier 28 into the zone 38 for sequential dispensing of the products from each of its compartments in turn, and so on until all products loaded into the machine 12 have been dispensed therefrom (or the supply of products have been replenished by service personnel, which can be conveniently and quickly done because of the manner in which products are depleted from the compartments and successive carriers 28 of the machine 12 on an ordered sequential basis). The remainder of the description will be predominately devoted to how the mechanism 58 accomplishes such purpose, with increased reference being made to the more detailed FIGS. 1–6 and 8–10.

Before leaving consideration of FIG. 7, however, it would seem appropriate to identify certain additional portions of the mechanism 58 at least broadly depicted therein. These include an electric motor drive means 74 mounted on the frame structure 70 for drivingly rotating a crank arm 76 pivotally coupled as at 77 with a link 78 in turn pivotally coupled as at 79 with a vertically reciprocable elevator assembly 80 for raising the latter from a lower standby position to a higher mid-cycle position, then lowering the assembly 80 back to its standby position, during each operating cycle of the drive means 74 (from which those skilled in the art will understand that the drive means 74 conventionally incorporates one-revolution cam switch means or the like for assuring that, once an operating cycle has been initiated, an energizing path for the motor of drive means 74 will be preserved, although perhaps temporarily interrupted as later explained, until the assembly 80 has completed its mentioned cycle).

As best shown in FIGS. 1–4, the frame means 70 of the mechanism 58 includes a transversely extending main plate 82, adjacent each side of which is mounted a vertical, track presenting channel 84, 86, which in turn receive for low friction guided movement therein upper rollers 88, 90 respectively mounted for rotation upon top brackets 92, 94 attached to a top flange 95 of the elevator assembly 80 adjacent the ends of the latter and lower rollers 96, 98 rotatably mounted on the assembly 80 itself. By such structure, the horizontally extending elevator 80 is mounted on the plate 82 for vertical movement from its standby position illustrated in FIG. 1 to its mid-cycle position illustrated in FIG, 4 and back to its standby position without substantial skewing and with only minimum forces being demanded from the drive means 74 to effect such movements through the inexpensive and reliable expedient of the crank 76 and 78.

Mounted on the rear of the elevator assembly 80 for vertical movement therewith and indexed horizontal reciprocatory movement relative thereto is a somewhat shorter, horizontally extending, indexable member 100, which is so mounted on the assembly 80 by stud pins 102 extending rearwardly from the assembly 80 through the spacer discs 104 and corresponding elongate slots 106 in the member 100. A tension spring 108 (FIG. 2) oppositely attached to the assembly 80 and the member 100 yieldably biases the latter toward a leftmost (as in FIGS. 1–4) position thereof imposed by engagement of the pins 102 with the right ends of the slots 106.

Simple but effective means for automatically indexing the member 100 from its mentioned leftmost position through successive incremental shifts toward the right relative to the assembly 80 are provided and primarily include a series of indexing teeth equal in number to the closures 60 formed in the upper edge of the member 100 adjacent the left end thereof to present an indexing ratchet rack 110 on the member 100, an indexing lever 112 swingably mounted as at 113 on the assembly 80 and carrying a rotatable indexing pawl 114 engageable with the teeth of the indexing rack 110, a bracket 116 mounted on the plate 82 and provided with a cam slot having an upper vertical stretch 118 and a lower stretch 120 inclined downwardly and to the right (as in FIGS. 1 and 4) for receiving a friction reducing roller 115 disposed between the lever 112 and the pawl 114 and rotatable upon a rearwardly extending sleeve 119 of the lever 112 for swinging the indexing lever 112 and the indexing pawl 114 toward the right as the elevator assembly 80 moves into its lower standby position from thereabove, and a tension spring 122 oppositely attached to the bracket 92 and a part of a stud portion 117 of the pawl 114 that is disposed in front of the lever 112. The spring 122 is so attached to the stud portion 117 of the pawl 114 (which are rotatable together relative to the lever 112) that the spring 122 will not only yieldably bias the top of the lever 112 and the pawl 114 toward the left (as in FIGS. 1, 2 and 4), but will also tend to maintain the pawl 114 in a rotated position relative to the rack 110 (best shown from the rear in FIGS. 5 and 6) such that the pawl 114 will engage the rack 110 when the elevator assembly 80 is in the lower range of its vertical reciprocation disposing the roller 115 in the inclined slot portion 120 but will be disengaged from the rack 110 when the assembly 80 is elevated sufficiently for the roller 115 to enter the vertical slot portion 118.

Because of the last-noted temporary releasing of the rack 110 by the pawl 114 during each cycle of elevation and return to standby position of the assembly 80, the indexing means for the indexable member 100 secondarily includes a row of anti-regress teeth equal in number to the closures 60 presenting a holding rack 124 on the assembly 80, and a holding plate element 126 (see also FIG. 10) swingably mounted on the member 100 as at 128 and provided with a tab portion 130 disposed when the element 126 is in its normal position illustrated in FIG. 1 for engaging the appropriate tooth of the holding rack 124 for preventing regressive movement of the member 100 to the left relative to the assembly 80 under the influence of the spring 108. The element 126 is rockable and is balanced (or, if desired, spring biased as at 127) so as to be shiftable between "over-center" extreme positions thereof constituting the normal holding position illustrated in FIG. 1 and the releasing position illustrated in FIG. 4. It will be understood that the element 126 remains in its normal holding position, swinging only slightly as required to permit its tab 130 to "ride over" and engage the next tooth of the holding rack 124 as the member 100 is shifted during indexing thereof, during indexing of the member 100 from its leftmost to its rightmost indexed positions. When the member 100 has reached its rightmost indexed position and the assembly 80 is elevated to its raised mid-cycle position, however, a rearwardly extending stud 132 on the element 126 will engage a tripping flange bracket 134 on the frame plate 82 to rock the element 126 "over center" into its released position, thereby withdrawing the tab 130 of the element 126 from the holding rack 124 and rendering the latter ineffective to continue holding the member 100 against leftward regressive movement relative to the assembly 80 under the influence of the spring 108. Such "resetting" of the member 100 from its rightmost position toward its leftmost "initial" position is deferred, however, by the sliding engagement of an upstanding post 136 mounted on the member 100 adjacent the right end of the latter with a vertical flange 138 provided for such purpose on the frame plate 82, as shown in FIG. 4. As the assembly 80 then proceeds downwardly during the portion of its operating cycle in which it returns from its raised mid-cycle position to its lowered standby position, however, the post 136 eventually clears below the flange 138, which, since the holding element 126 has also been rocked to its releasing position, permits the member 100 to move to leftmost position under the influence of the spring 108. As the assembly 80 then continues to move downwardly into the standby position, a stud 140 on the lower right portion of the holding element 126 engages a lower horizontal flange 142 on the frame plate 82 to rock the element 126 back into its normal anti-regress holding position, as shown in FIG. 1.

The essentials of operation of the means for indexing and resetting the position of the indexable member 100 relative to the elevator assembly 80 can now be explained as a prelude to consideration of the additional structural parts and relationships which employ the cycling of the assembly 80 and member 100 for controlling the operation of the closures 60 and conveyor 22 in the desired manner. Assuming that the various structural parts thus far described are in their normal or standby positions as illustrated in FIG. 1, it will be noted that the member 100 is being held in its leftmost indexed position by the engagement of the tab 130 of the holding element 126 with the leftmost tooth of the holding rack 124 on the elevator assembly 80, and that the advancing pawl 114 is engaged with the rightmost tooth of the indexing rack 110 on the member 100 assuring that the member 110 is properly positioned in its leftmost indexed position (which will be slightly to the right of the leftmost extreme of the travel of the member 100 to allow for the shifting of the member 100 which occurs as the pawl 114 is moved to the right by the action of the inclined cam slot portion 120 during completion by the assembly 80 of its return to its standby position following resetting of the member to its extreme leftmost position by the spring 108).

With the parts in such condition, upon initiation of an operating cycle of the drive means 74 by the coin handling or other actuating means 56, the drive means 74 will commence turning the crank 76 to operate the link 78 to start raising the elevator assembly 80 away from its standby position, and the inclined camming slot portion 120 will permit the lever 112 to swing toward the left thereby raising the pawl 114 and disengaging the latter from the indexing rack 110 (as best generally shown from the rear in FIG. 6, but for other than the initial indexed position of the member 100); but the member 100 will remain in its initial or leftmost indexed position as the elevator assembly 80 is raised to its top or mid-cycle position, by virtue of the anti-regress holding action of the element 126 whose tab 130 remains in engagement with the first tooth of the holding rack 124. For reasons later more fully explained (but involving safety considerations with respect to not closing an opened closure 60 as long as the outer access door 42 is open), as the assembly 80 reaches its upper or mid-cycle position, the flange 95 thereon engages a feeler sensing switch 144 to actuate the latter; as those skilled in the art will understand, the mid-cycle position sensing switch 144 and outer door closed sensing switch 54 are operable associated electrically with the energizing circuit for the drive means 74 in conventional fashion, such that energization of the drive means 74 will be temporarily interrupted as the assembly 80 reaches its mid-cycle position to retain the assembly 80 in that position until the user has opened the outer door 42, presumably removed a product from the dispensing zone 38 through the path cleared by opening of a closure 60 in the manner hereinafter described, and reclosed the outer door 42, whereupon the actuation of the switch 54 by reclosing of the door 42 will restore energization to the drive means 74 for completing its operating cycle.

As the drive means 74 thus continues turning the crank 76 from the mid-cycle position thereof illustrated in FIG. 4, the link 78 will lower the assembly 80 back toward its lower standby position; meanwhile, the pawl 114 remains out of engagement with the indexing rack 110, but the tab 130 of the element 126 remains engaged with the holding rack 124 for maintaining the member 100 in the indexed position to which it had previously been set (at this juncture, its first or leftmost indexed position). As the assembly 80 continues to approach its standby position during the latter part of the operating cycle, however, the roller 115 enters the inclined cam slot portion 120, thereby swinging the top of the lever 112 toward the right (as in FIGS. 1 and 4) and moving the pawl 114 down into the notch of the indexing rack 110 for engaging the second tooth of the latter. As the downward movement of the assembly 80 completes its progress into the standby position thereof, the inclined slot portion 120 pushes the pawl 114 further to the right (as in FIG. 1), thereby similarly pushing the second tooth of the indexing rack 110 toward the right until the member 100 has been shifted into its second indexed position relative to the assembly 80. During such indexing movement of the member 100 into its second indexed position, the tab 130 of the element 126 "rides over" the second tooth of the holding rack 124 and engages the right side of the latter to hold the member 100 in the second indexed position thereof to which it has been shifted. Upon the assembly 80 fully reaching its standby position, that operating cycle is completed, and the conventional "one-revolution" energization maintaining means associated with the drive means 74 cuts off operating power to it through switch 146 until initiation of the next operating cycle by the actuating means 56.

Thereafter, upon the initiation of each successive operating cycle of the drive means 74 by the actuating means 56, the actions just described are repeated to move the elevator assembly 80 from its standby position (as in FIG. 1) to its raised mid-cycle position (as in FIG. 4) and back to its standby position, during each of which cycles the indexable member 100 is shifted into the next of its increasingly rightward (in FIGS. 1 and 4) indexed positions, until the rightmost position thereof is reached.

During the operating cycle commencing with the member 100 in its rightmost indexed position, however, the action is somewhat different. Although the assembly 80 is still moved from its standby position to its mid-cycle position and back in the same manner, at the mid-cycle position of the assembly 80 the holding element is rocked to its released position by engagement of its stud 132 with the frame bracket 134, thereby disengaging the tab 130 from the holding rack 124 and permitting the member 100 to be reset to the extreme leftmost end of its path of travel by the spring 108 as soon as the assembly 80 has been sufficiently lowered for the post 136 to clear below the frame flange 138. Then, as the assembly 80 completes its return to its standby position, the swinging of the lever 112 and pawl 114 by the inclined camming slot portion 120 re-engages the pawl 114 with the first tooth of the indexing rack 110 and pushes the member 100 from its extreme leftward disposition to which it was moved by the spring 108 into its first, leftmost indexed position, and meanwhile the holding element 126 is rocked back into its normal position by engagement of its stud 140 with the frame flange 142 so that the tab 130 re-engages the first tooth of the holding rack 124 to maintain the member 100 in its indexed position until reindexing thereof during the next operating cycle of the drive means 74.

It would also appear appropriate to note at this stage of the description the provision of a reset sensing switch 147, which may be mounted in any suitable location upon the frame plate 82, as illustrated, in such manner that the switch 147 will be engaged so as to be actuated by the indexing rack 110 or other structure on the member 100 at its last or rightmost indexed position. Actuation of the switch 147 is effective to cause the switch 146, when next actuated by return of the elevator 80 to its standby position, to energize the conveyor motor 26 for advancing the next carrier 28 into the dispensing zone 38. Particularly since the contribution to the art made by this invention is so largely dominated by the novel mechanical aspects of the machine 12 and especially the mechanism 58 thereof, those skilled in the art will understand that the identity, locations and actuating relationships for the sensing switches 54, 144, 146 and 147 are intended as merely illustrative, and that other or additional sensing switches may be conventionally employed, located and actuated, perhaps in conjunction with relays if desired, to provide such safety and other interlocks for the energization of the drive means 74 and the conveyor motor 26 as may be appropriate to particular applications. For present purposes of illustration, however, it should suffice to note that we prefer to not only functionally associate the reset sensing switch 146 with the energizing circuit for the conveyor motor 26 in such manner that the latter will be automatically actuated for advancing the conveyor 22 to move the next carrier 28 into the dispensing zone 38 upon each resetting of the indexable member 100 to its initial leftmost indexed position, but also, for safety purposes, to appropriately tie such energizing circuitry for the conveyor motor 26 in with the outer door closed sensing switch 54 (which, as noted, may also be used to delay return of the assembly 80 from its mid-cycle position to its standby position), in order to inhibit the conveyor 22 from moving carriers 28 relative to dispensing zone 38 unless and until the outer access door 42 is closed.

Figure 8:
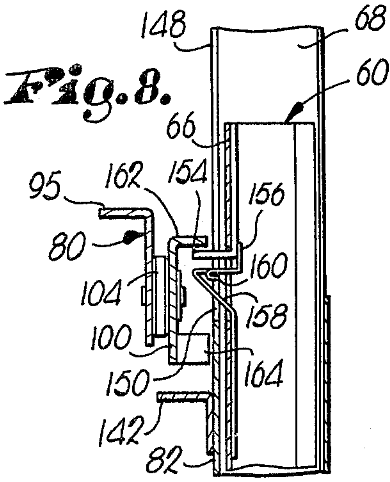
FIG. 8 is an enlarged, fragmentary, vertical, cross-sectional view of closure latching and lifting portions of the mechanism, with a closure depicted in its closed and latched position.
Figure 9:
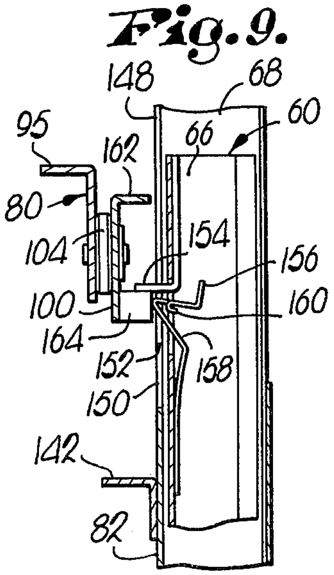
FIG. 9 is an enlarged, fragmentary, vertical, cross-sectional view of the same portions of the mechanism as shown in FIG. 8, but with the closure depicted in unlatched condition and being lifted.
Figure 10:
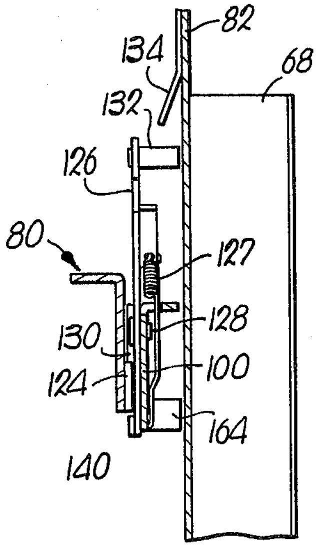
FIG. 10 is an enlarged, fragmentary, vertical, cross-sectional view of the anti-regress dog and tripping flange parts of the indexable portion of the mechanism.

The operational relationships and significance of the cycling of the elevator assembly 80 and the indexing and resetting of the indexable member 100 to providing the desired sequential control for the closures 60 can now be readily understood from consideration of a few additional structural parts and actions next to be described. It will first be noted that the frame plate 82 has a plurality of spaced, elongate, vertical slots 148 formed therein, one for each of the closures 60 and respectively aligned centrally with the upper portions 66 of the latter. Each of the slots 148 is provided at its lower end with an enlarged rectangular opening 150 presenting a pair of downwardly facing shoulders 152 at the opposite sides of the bottom of the slot 148. Referring now also to FIGS. 8 and 9, it will next be seen that the upper portion 66 of each closure 60 is provided with a forwardly (leftwardly in FIGS. 8 and 9) extending lifting tab 154 mounted thereon and protruding through the corresponding slot 148, and therebelow with a resilient, releasable latching element 156 mounted thereon and including a forwardly extending, frontally inclined shiftable portion 158 of width adapted to extend through the slot 148 and a wider latching portion 160 shiftable with the portion 158 and of width adapted to extend through the opening 150 and engage the shoulders 152 but too wide to extend through the slot 148. Thirdly, note that the indexable member 100 is integrally provided with a longitudinal top flange 162 extending rearwardly into overlying relationship with the lifting tabs 154 of all of the closures 60 except the rightmost one, and with a series of spaced latch releasing and lifting ears 164 equal in number to the closures 60 and disposed at a level below the inclined portions 158 of the latching elements 156. The ears 164 are, however, so spaced along the member 100, as best shown in FIGS. 2 and 3, that only a single ear 164 is ever aligned vertically below the tab 154 and element 156 of the corresponding closure 60; the disposition of the ears 164 along the member 100 is different from the spacing between the slots 148 and predetermined so that the leftmost ear 164 will be aligned below the tab 154 and element 156 of the leftmost closure 60 when the member 100 is in its leftmost indexed position, the second from left ear 164 will be aligned below the tab 154 and element 156 of the second from left closure 60 when the member 100 is in its second from left indexed position, and so on. In FIG. 2, the ear 164 is so aligned beneath the tab 154 and element 156 of the closure 60 that is the third from the left.

The manner in which the mechanism 58 automatically controls the operation of closures 60 sequentially and in predetermined order (from left to right in the preferred embodiment described, although this could be easily changed merely by relocation of the ears 164) would now appear to require further explanation only in certain limited respects. Each of the closures 60 is, of course, normally latched in its lowered closed condition by the engagement of the widened portion 160 of its latching element 156 with the shoulders 152 of the corresponding opening 150 and the five leftmost of the closures 60 are further protected against unauthorized opening prior to initiation of a dispensing cycle upon appropriate coinage deposit by the overlying relationship of the flange 162 on the member 100 (or a projection 166 on elevator 80 in the case of the rightmost closure 60, as shown in FIG. 3) to the lifting tabs 154 thereof while the elevator assembly 80 remains in its standby position. Upon initiation of a dispensing cycle and the commencement of upward movement of the elevator assembly 80 away from its standby position, however, the particular lifting ear 164 for the closure 60 next to be sequentially operated (determined by the position to which the member 100 is then indexed, as previously described) first engages the inclined portion 158 of the corresponding resilient latching element 156 to force the widened portion 160 thereof rearwardly from beneath the shoulders 152 of the corresponding opening 150, thereby unlatching that particular single closure 60 (assume the leftmost one). As the raising of the assembly 80 continues toward its mid-cycle position, the operative ear 164 next engages the bottom of the corresponding lifting tab 154 (see FIG. 9) to lift the corresponding closure 60 to its raised open position permitting user access to the product within the corresponding compartment of the carrier 28 that is in the dispensing zone. As the dispensing cycle is continued to lower the assembly 80 back to its standby position, the descending ear 164 associated with opened closure 60 permits the latter to return to its normally closed position, whereupon it is automatically latched closed by re-entry of the widened portion 160 of the corresponding element 156 into the associated opening 150 and re-engagement thereof with the shoulders 152 of the latter. During the return of the opened closure 60 to its closed position, if for any reason it should tend to "hang up," the flange 162 on the member 100 will engage the top of its lifting tab 154 to urge it downwardly. As previously described, indexing (or resetting) of the member 100 also occurs during the descending return of the assembly 80 to its standby position. In the case of resetting the member 100 from its last sequential indexed position to its initial indexed position, however, the resetting movement of the member 100 displaces the flange 162 thereon from its overlying relationship to the lifting tab 154 of the rightmost closure 60 before the latter may have fully reclosed; in order to provide for downward urging of such rightmost closure 60 in case it should tend to "hang up" before complete reclosing thereof, therefore, an appropriately located rearward projection 166 may be provided on the assembly 80 itself.

It will thus be recognized that the combined control over sequential operation of the closures 60 and periodic advancement of the conveyor 22 provided by the mechanism 58 present a unique solution to the need for a relatively simple and economical machine 12 for reliably vending all of the products stored therein in a predetermined sequential order. As will be apparent to those skilled in the art, various changes and modifications can be made from the particular details of construction of the preferred embodiment disclosed for illustration without departing from the real gist and essence of the intention. Accordingly, it is to be understood that the invention should be deemed limited only by the fair scope of the claims which follow and mechanical equivalents thereof.

We claim:

1. In product dispensing apparatus:

product enclosing means for housing products to be dispensed, said enclosing means having an internal zone including a plurality of individual stations from which products are to be dispensed by user removal thereof, said enclosing means being provided with aperture means for presenting paths for user access to each of said stations respectively;

individually shiftable closure means for each of said paths respectively mounted on said enclosing means for obstructing the corresponding path to user access when said closure means is in a closed position thereof and clearing the corresponding path for user access when said closure means is shifted to an open position thereof;

releasable holding means for each of said closure means respectively mounted on said enclosing means for normally holding the corresponding closure means in its closed position;

actuating means mounted on said enclosing means for initiating a successive product dispensing cycle of said apparatus in response to each successive actuation of said actuating means;

dispensing control means mounted on said enclosing means and including releasing means operably associated with said holding means and operable in response to each successive actuation of said actuating means for releasing one of said holding means, while leaving the remaining holding means in their holding condition, with the various holding means being so released sequentially in a predetermined order during successive dispensing cycles of said apparatus, said dispensing control means further including opening means operably associated with said closure means and operable in response to each successive actuation of said actuating means for shifting an individual closure means whose corresponding holding means has been released from said closed position to said open position thereof, while leaving the remaining closure means in their closed position, with the various closure means being so opened sequentially in said predetermined order during successive dispensing cycles of said apparatus, said releasing means and said opening means also including movable means common to said holding means and said closure means and movable relative thereto between standby and fully displaced positions of said movable means, indexable means shiftably carried by said movable means and including means shiftable into respective positions thereof for first engaging a corresponding one of said holding means to release the latter and then engaging means on the corresponding closure means to shift the latter from its closed position to its opened position during movement of said movable means from its standby position to its fully displaced position and finally engaging the closure means that has been shifted to its opened position for finally shifting the latter from its opened position back to its closed position during movement of said movable means from its fully displaced position back to its standby position, indexing means operably coupled with said indexable means for shifting the latter into successive ones of said respective positions thereof sequentially in said predetermined order during successive return movements of said movable means from its fully displaced position to its standby position, and drive means operably coupled with said movable means for moving the latter from its standby position to its fully displaced position, then back to its standby position, during each successive dispensing cycle of said apparatus; and normally closed, shiftable, outer, access door means common to all of said paths for preventing user access to any of said paths unless said outer door means is open, said control means including means for inhibiting said drive means from moving said movable means from its fully displaced position to its standby position to close an opened closure means unless and until said outer door means is in its closed condition.

2. In product dispensing apparatus:

product enclosing means for housing products to be dispensed, said enclosing means having an internal zone including a plurality of individual stations from which products are to be dispensed by user removal thereof, said enclosing means being provided with aperture means for presenting paths for user access to each of said stations respectively;

individually shiftable closure means for each of said paths respectively mounted on said enclosing means for obstructing the corresponding path to user access when said closure means is in a closed position thereof and clearing the corresponding path for user access when said closure means is shifted to an opened position thereof;

releasable holding means for each of said closure means respectively mounted on said enclosing means for normally holding the corresponding closure means in its closed position;

actuating means mounted on said enclosing means for initiating a successive product dispensing cycle of said apparatus in response to each successive actuation of said actuating means;

dispensing control means mounted on said enclosing means and including releasing means operably associated with said holding means and operable in response to each successive actuation of said actuating means for releasing one of said holding means, while leaving the remaining holding means in their holding condition, with the various holding means being so released sequentially in a predetermined order during successive dispensing cycles of said apparatus;

shiftable product supporting means mounted within said enclosing means and including a plurality of product carrier means each adapted to carry a plurality of products and shiftable into said zone for presenting a set of products to be dispensed with a respective product initially at each of said stations; and shifting means operably coupled with said supporting means for shifting a different carrier means into said zone, with the various carrier means being so shifted into said zone sequentially in a predetermined sequence in response to successive actuations of said shifting means, said control means including sensing means for sensing when the last of said holding means in said predetermined order thereof has been released, resetting means for resetting said releasing means in response to said sensing by said sensing means to subsequently release said holding means sequentially in the same predetermined order during further successive dispensing cycles of said apparatus, and product set replenishment means for actuating said shifting means in response to said sensing by said sensing means to shift the next carrier means into said zone.

3. Apparatus as set forth in claim 2, wherein said releasing means includes:

movable means common to said holding means and movable relative thereto between standby and fully displaced positions of said movable means;

indexable means shiftably carried by said movable means and including means shiftable into respective positions thereof for engaging a corresponding one of said holding means to release the latter during movement of said movable means from its standby position to its fully displaced position;

indexing means operably coupled with said indexable means for shifting the latter into successive ones of said respective positions thereof sequentially in said predetermined order during successive return movements of said movable means from its fully displaced position to its standby position; and drive means operably coupled with said movable means for moving the latter from its standby position to its fully displaced position, then back to its standby position, during each successive dispensing cycle of said apparatus.

4. Apparatus as set forth in claim 2, wherein said control means includes:

opening means operably associated with said closure means and operable in response to each successive actuation of said actuating means for shifting an individual closure means whose corresponding holding means has been released from said closed position to said opened position thereof, while leaving the remaining closure means in their closed position, with the various closure means being so opened sequentially in said predetermined order during successive dispensing cycles of said apparatus.

5. Apparatus as set forth in claim 4, wherein said releasing means and said opening means include:

movable means common to said holding means and said closure means and movable relative thereto between standby and fully displaced positions of said movable means;

indexable means shiftably carried by said movable means and including means shiftable into respective positions thereof for first engaging a corresponding one of said holding means to release the latter and then engaging means on the corresponding closure means to shift the latter from its closed position to its opened position during movement of said movable means from its standby position to its fully displaced position;

indexing means operably coupled with said indexable means for shifting the latter into successive ones of said respective positions thereof sequentially in said predetermined order during successive return movements of said movable means from its fully displaced position to its standby position; and drive means operably coupled with said movable means for moving the latter from its standby position to its fully displaced position, then back to its standby position, during each successive dispensing cycle of said apparatus.

6. Apparatus as set forth in claim 5, wherein:

said indexable means engages the closure means that has been shifted to its opened position for finally shifting the latter from its opened position back to its closed position during movement of said movable means from its fully displaced position back to its standby position.

7. Apparatus set forth in claim 6, wherein is provided:

normally closed, shiftable, outer, access door means common to all of said paths for preventing user access to any of said paths unless said outer door means is open; and said control means includes means for inhibiting said drive means from moving said movable means from its fully displaced position to its standby position to close an opened closure means unless and until said outer door means is in its closed condition.

8. Apparatus as set forth in claim 7 wherein:

said control means includes means for inhibiting said replenishment means from actuating said shifting means to shift the next carrier means into said zone unless and until said outer door means is in its closed condition.

9. Apparatus as set forth in claim 8, wherein:

said actuating means includes coin deposit responsive means.

10. Apparatus as set forth in claim 8, wherein:

said closure means are reciprocable, and said door means is swingable.

11. Product dispensing apparatus comprising:

a cabinet having an elongate, horizontally extending dispensing zone therewithin from which products are to be dispensed by user removal thereof and an elongate, horizontally extending product access opening communicating with said zone from the exterior of said cabinet;

a conveyor within said cabinet including a plurality of elongate, horizontally extending product carriers each have a longitudinal series of product compartments and an electric advancing motor for moving a different product carrier into said dispensing zone upon each operation of said advancing motor;

an outer, normally closed, user openable, door swingably mounted on said cabinet for obstructing or clearing said access opening;

a plurality of inner, normally closed, independently openable, side-by-side, closure structures, equal in number to said compartments of each of said product carriers, each mounted on said cabinet for vertical reciprocation between a lowered position thereof for obstructing a respective user access path through said access opening to a corresponding compartment of a product carrier disposed in said dispensing zone and a raised position thereof for clearing said path;

a releasable latch in said cabinet for each of said closure structures respectively for normally latching the latter in said lowered position thereof;

an elongate, horizontally extending, elevator assembly mounted within said cabinet for vertical reciprocation between a lower standby position and a higher mid-cycle position;

drive means, including an electric motor, operably coupled with said elevator assembly for raising the latter from its standby position to mid-cycle position upon initiation of each actuation of said drive means and for lowering said assembly from its mid-cycle position back to its standby position upon continuance of each actuation of said drive means;

coin deposit receiving means for initiating an actuation of said drive means in response to each proper coinage deposit;

means for sensing the position of said door and for delaying continuance of an actuation of said drive means when said elevator assembly is at its mid-cycle position and said door is open until said door is reclosed;

a lifting and lowering tab on each closure structure respectively;

an indexable member mounted on said elevator assembly for vertical movement with the latter and for horizontal movement relative to the latter successively from an initial position through a plurality of intermediate positions to a terminal position and back to said initial position in a predetermined order, said positions of said indexable member being equal in number to the number of said closure structures;

engaging elements carried by said indexable member and disposed thereon for engaging said latch and said tab associated with a different one of said closure structures for each of said positions of said indexable member;

means responsive to each movement of said elevator assembly from its mid-cycle position to its standby position for indexing said indexable member to move to the next of said successive positions of the latter, said engaging elements engaging said latch of the appropriate closure structure to release the same and then engaging said tab of the appropriate closure structure to lift the latter to its position for clearing the access path to a corresponding compartment of the carrier in said dispensing zone during each movement of said elevator assembly from its standby position to its mid-cycle position, and said engaging elements then engaging said tab of the same closure structure to lower the latter to its access path obstructing position during the following movement of said elevator assembly from its mid-cycle position back to its standby position; and means responsive to movement of said elevator assembly from its mid-cycle position to its standby position when said indexable member is in said terminal position thereof for actuating said advancing motor for moving the next product carrier into said dispensing zone, whereby said apparatus will dispense all of the products stored in said compartments of said carriers sequentially in a predetermined order.

12. Apparatus as set forth in claim 11, wherein:

said door and each of said closure structures is at least partially transparent to permit user viewing of products in the said compartments of the carrier disposed in said sensing zone.

13. Apparatus as set forth in claim 11, wherein:

said means for indexing said indexable member includes means yieldably biasing said indexable member toward said initial position thereof, indexing ratchet means on said indexable member, shiftable ratchet operating means for engaging said indexing ratchet means to move said indexable member one position toward said terminal position thereof against the influence of said biasing means each time said elevator assembly is moved from its mid-cycle position to its standby position, shiftable means on said elevator assembly engageable with said indexable member for releasably holding said indexable member in any of its intermediate and its terminal position, and means engageable with said shiftable means when said indexable member is in its terminal position and said elevator assembly is moved into its mid-cycle position for shifting said shiftable means out of engagement with said indexable member to permit the latter to move to its initial position under the influence of said biasing means.

14. Apparatus as set forth in claim 11, wherein:

said means for actuating said advancing motor includes electrical switching means for the latter disposed to be engaged and actuated by means on said indexable member when the latter is in its terminal position and said elevator means is moved to its mid-cycle position and back to its standby position.

15. Apparatus as set forth in claim 11, wherein:

said means for sensing the position of said door includes electrical switching means disposed to be actuation by closing of said door and operably associated with said motor of said drive means.

* * * * *